INVENTORS
Claude VENNE
Robert FOREST
Serge PERREAULT

ATTORNEY

INVENTORS
Claude VENNE
Robert FOREST
Serge PERREAULT

ATTORNEY

United States Patent Office 3,478,611
Patented Nov. 18, 1969

3,478,611
VARIABLE SPEED DRIVE ASSEMBLY
Claude Venne, 694 Bastien, Robert Forest, 637 Terrace Forest, and Serge Perreault, 61 Boulevard des Hauteurs, all of St. Jerome, Quebec, Canada
Filed July 15, 1968, Ser. No. 744,762
Int. Cl. F16h 55/56
U.S. Cl. 74—230.17                                   10 Claims

ABSTRACT OF THE DISCLOSURE

This invention relates to a drive assembly comprising generally a rotatable drive shaft, a first annular pulley half having a tapered wall defining one pulley surface secured to the shaft, a piston member also secured to the shaft forming a first portion of a liquid chamber and a cylinder member telescopically mounted on the piston member and forming therwith a closed liquid chamber, the cylinder member having a tapered wall forming a second pulley half. A pressure compensator is positioned in the liquid chamber to compensate for the variation of volume due to the relative movement of the piston and cylinder members. The pressure compensator is in communication with the exterior to permit air to flow in and out of the chamber in a controlled manner while preventing the liquid from flowing out of the chamber. Consequently the pressure compensator acts as a cushion for controlling the rate of relative movement of the piston member with respect to the cylinder member.

---

This invention relates to a variable speed drive assembly which takes advantage of the centrifugal force to engage the drive assembly and vary its speed.

Various constructions have been proposed in the art using the centrifugal force acting on a mass of metal shots or on a liquid to cause the two halves of a V-shaped pulley to move together to engage a friction drive or to vary the speed ratio of the drive by forcing a belt located in the V-shaped pulley to move up the inclined walls of the pulley. However, most of the prior art devices suffer from serious drawbacks in that there is no means provided to control the rate of speed variation of the drive, or to vary the speed at which the drive is engaged.

It is therefore the main feature of the invention to provide a centrifugally operated variable speed drive assembly having means to control the rate of speed variation thereof.

It is also a feature of the invention to provide a centrifugally operated drive assembly having means to vary the speed at which the drive is engaged.

The drive assembly comprises generally a rotatable drive shaft, a first annular pulley half having a tapered wall defining one pulley surface secured to the shaft, a piston member also secured to the shaft forming a first portion of a liquid chamber and a cylinder member telescopically mounted on the piston member and forming therewith a closed liquid chamber, the cylinder member having a tapered wall forming the second pulley half. Upon rotation of the shaft at a predetermined speed, the liquid contained in the chamber acts on the tapered wall of the cylinder member and moves the second pulley half axially towards the first pulley half to engage a belt position therebetween. Further increase of the speed of rotation of the shaft causes the belt to raise along the tapered surfaces of the pulley a distance proportional to the speed of the shaft to effectively vary the diameter of the pulley and the torque applied to the driven element. In accordance with the invention, a pressure compensator is positioned in the liquid chamber to compensate for the variation of volume due to the relative movement of the piston and cylinder members. The pressure compensator is in communication with the exterior to permit air to flow in and out of the chamber in a controlled manner while preventing the liquid from flowing out of the chamber. Consequently the pressure compensator acts as a cushion for controlling the rate of relative movement of the piston member with respect to the cylinder member.

The invention will now be disclosed with reference to the drawings which illustrate preferred embodiments of the invention with no intention, however, to limit the invention to the embodiments disclosed. In the drawings.

Figure 1:
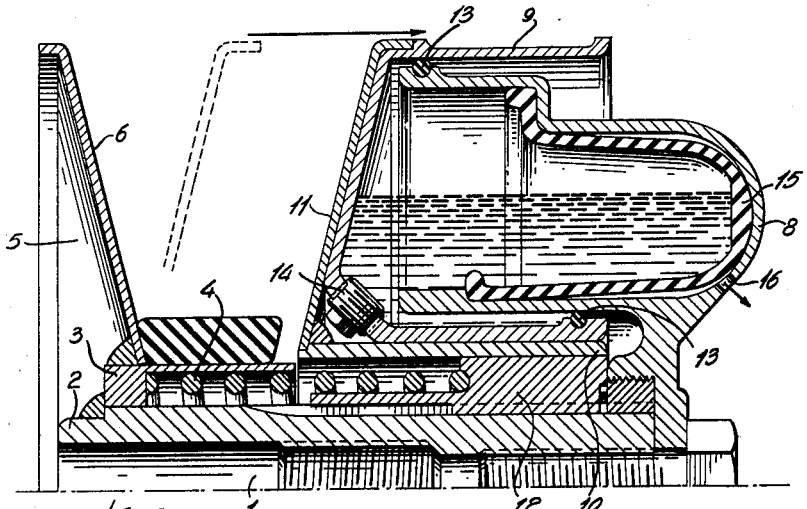
FIGURE 1 illustrates in cross-section a first embodiment of the invention at rest.

In FIGURE 1, there is shown a rotatable shaft 1 surrounded by a sleeve 2 at one end of which is secured a member 3 having a recess for receiving the end of a spring 4 whose function will be disclosed later. A first annular pulley half 5 having a tapered wall 6 is secured to member 3. A belt 7 is also illustrated as resting on member 3.

A piston member 8 is secured to the other end of shaft 1 by a securing means such as a nut. Piston member 8 forms a liquid chamber open at one end. The open end of piston member 8 is closed by a cylinder member 9 which is mounted for axial movement on shaft 1 but secured thereto for rotational movement. Various means of mounting cylinder member 9 to shaft 1 are envisaged. In FIGURE 1, cylinder member 9 is secured to an annular member 10 which in turn is secured to a member 12 which is mounted for axial movement on shaft 1. Annular member 10 has a tapered wall 11 adapted to engage belt 7 when it is moved axially. Member 12 includes a recess portion which receives the other end of spring 4 for biasing apart the two halves of the pulley.

The liquid chamber which is formed by piston member 8 and cylinder member 9 is sealed by rings 13. In order to operate the drive assembly, a predetermined amount of liquid such as oil is introduced in the liquid chamber through inlet 14.

In accordance with the main feature of the invention, a pressure compensator 15 is secured inside piston member 8 in such a way as to prevent the liquid in the chamber from escaping out of the piston through openings 16 (only one illustrated). When the shaft is at rest, pressure compensator 15 which is made of elastic material is compressed against the inside wall of the piston member 8 by the liquid contained in the chamber. When the shaft starts to rotate, the volume of the chamber, due to the relative movement of the piston member 8 and cylinder member 9 is increased and the air admitted through air openings 16 pushes the elastic compensator 15 away from the inside wall of piston member 8. Compensator 15 prevents the formation of a vacuum inside the chamber which would hinder the operation of the variable speed drive as it will be explained more fully in the following description of the operation of a drive assembly.

Figure 2:
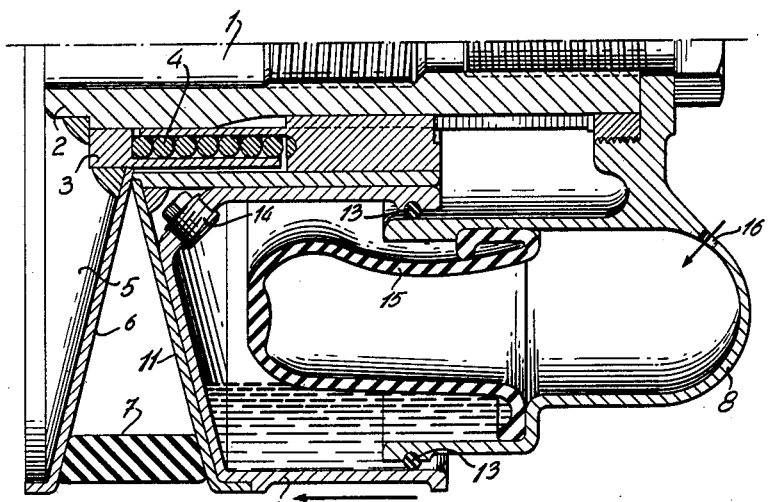
FIGURE 2 illustrates in cross-section the same embodiment when the shaft is rotating at full speed.

The description will now be completed by reference to the operation of the device of FIGURE 1 with further reference to FIGURE 2 which illustrates the drive assembly when operating at maximum speed. When shaft 1 is set in motion, piston member 8 and cylinder member 9 start to rotate and the liquid contained in the chamber formed thereby exerts a centrifugal force on the tapered wall of cylinder member 9 to move the annular member 10 axially towards the tapered wall 6 so as to cause belt 7 to move up slightly the inclined walls 6 and 11 to engage the drive when the shaft 1 rotates at a predetermined speed. Further increase in the speed of rotation of the shaft will cause the belt 7 to move up higher along the inclined walls 6 and 11 to effectively vary the diameter of the pulley thereby varying the speed of the drive assembly.

The rate of axial movement of the annular member 11 is controlled by pressure compensator 15 which, as illustrated in FIGURE 2, may be completely reversed inside out at maximum speed. The action of pressure compensator 15 is regulated by the size of the openings 16 which controls the flow of air in and out of the compensator. The smaller the openings are, the slower is the rate of movement of cylinder member 9. Similarly, the larger the openings are, the faster is the rate of movement of cylinder member 9. As it will be easily understood, it is very important to be able to control such rate of movement in order to prevent any sudden torque variations on the driven element.

The invention also provides for an efficient control of the speed at which engagement of the drive is performed. This is accomplished by varying the amount of liquid in the chamber formed by the piston 8 and cylinder member 9. If the chamber is full of liquid, the drive will be engaged at low speed. On the other hand, if the chamber contains less liquid, the drive will be engaged at higher speed.

Finally, piston member 8 and cylinder member 9 may be made of a plastic material to facilitate manufacture thereof and also lower the cost. This is possible because the pressure applied on the piston and cylinder members are distributed over large surfaces.

In the present embodiment, cylinder member 9 is separate from annular member 10 in order to be able to make the cylinder member out of plastic. In cases where this is not required, cylinder member 9 may be integral with annular member 10.

Figure 3:
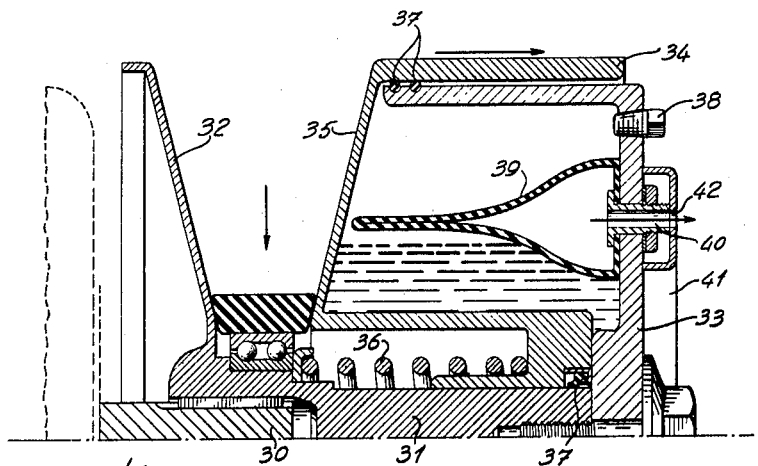
FIGURE 3 illustrates in cross-section a second embodiment of the invention at rest.
Figure 4:
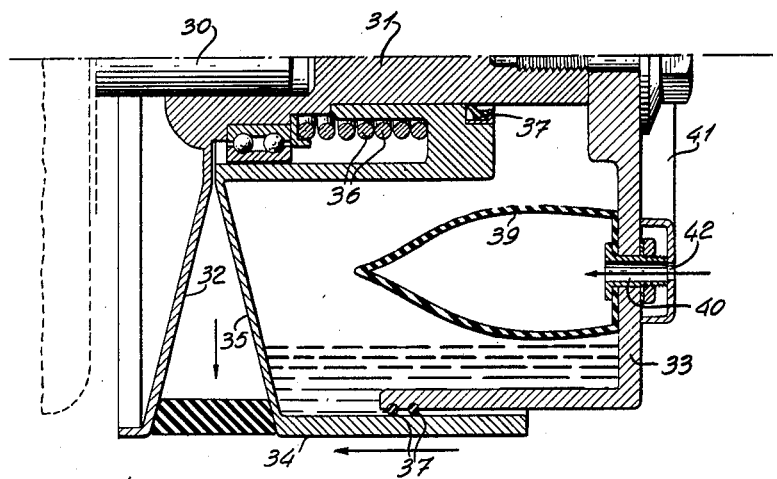
FIGURE 4 illustrates in cross-section the second embodiment of the invention when the shaft is rotating at full speed.

FIGURES 3 and 4 illustrate a second embodiment of the invention which is similar in many respects to the embodiment of FIGURES 1 and 2. In FIGURES 3 and 4, there is shown a rotatable shaft 30 which is secured by a member 31 having at one end thereof an annular flange with a tapered wall 32 forming the first half of the pulley. To the other end of member 31 is secured a piston member 33. A cylinder member 34 forms with piston member 33 a liquid chamber having a variable volume. Cylinder member 34 moves axially with respect to member 31 but rotates therewith. Cylinder member 34 has a tapered wall 35 which forms the other half of the pulley. The portion of cylinder member 34 which is adjacent to member 31 has a recess therein which encloses a spring 36 biasing apart the two halves of the pulley.

The liquid chamber which is formed by piston member 33 and cylinder member 34 is sealed by rings 37. A predetermined amount of liquid such as oil is introduced in the liquid chamber by means of inlet 38.

An elastic pressure compensator 39 is secured to piston member 33 in such a way as to prevent the liquid from escaping out of the piston through openings 40 (only one illustrated). The function of pressure compensator 39 is the same as compensator 15 of FIGURE 1. In addition, there is illustrated a ring 41 which is rotatable with respect to the axis of member 31 so as to vary the relative position of apertures 42 in ring 41 with respect to openings 40 in piston member 33. Such relative movement of ring 41 permits a variation in the size of openings 40 and consequently controls the flow of air in and out of elastic member 39. As mentioned previously such control of air controls the rate of displacement of cylinder member 34 with respect to piston member 33.

The invention has been disclosed with reference to two preferred embodiments of the invention. It is understood however that various modifications of the embodiments disclosed may be envisaged by one skilled in the art without departing from the scope of the invention. For example, various shapes and numbers of elastic members 15 and 39 may be envisaged. Furthermore, members 15 and 39 could be replaced by intake valves which prevent the liquid in the chamber formed by the cylinder and piston members from escaping through openings 16 or 40 while permitting air to flow in and out of the chamber. In addition, the pressure compensators 15 or 39 could be located in the cylinder member 9 or 34 instead of the piston member 8 or 33.

We claim:
1. A variable speed drive assembly comprising:
   (a) a rotatable drive shaft;
   (b) a first annular pulley half having a tapered wall portion defining one pulley surface secured to said shaft;
   (c) a piston member secured to said shaft and forming a first portion of a liquid chamber;
   (d) a cylinder member telescopically mounted on said piston member and forming therewith a closed liquid chamber, said cylinder member having a tapered wall portion forming a second pulley half and being mounted for axial movement towards the first pulley half under the action of centrifugal forces when the shaft is rotated; and
   (e) a pressure compensator positioned in said liquid chamber to compensate for the increase of volume due to the relative movement of the piston and cylinder members, said pressure compensator acting as a cushion for controlling the rate of relative movement of the cylinder member with respect to the piston member.

2. A variable speed drive assembly as defined in claim 1, further including means for biasing apart the two pulley halves, the rotation of said shaft at a first predetermined speed causing the second pulley half to move towards the first pulley half to engage a belt positioned between said two pulley halves, and rotation of said shaft at a speed faster than said predetermined speed moving the two pulley halves closer together and causing said belt to raise up the inclined walls of the two pulley halves to effectively vary the diameter of the pulley thereby varying the speed of the drive assembly.

3. A variable speed drive assembly as defined in claim 2, wherein said biasing means is a spring located between the two pulley halves.

4. A variable speed drive assembly as defined in claim 1, further including rings located between said piston and cylinder members to seal the liquid chamber.

5. A variable speed drive assembly as defined in claim 1, further including a liquid inlet for said liquid chamber whereby the amount of liquid in said chamber may be set so as to change the speed at which the drive is engaged.

6. A variable speed drive assembly as defined in claim 5, wherein said liquid inlet is located in the piston member.

7. A variable speed drive assembly as defined in claim 5, wherein said liquid inlet is located in the cylinder member.

8. A variable speed drive assembly as defined in claim 1, wherein said liquid chamber has communications with the outside, and wherein said pressure compensator is an elastic member secured inside said liquid chamber so as to prevent the liquid from flowing out of said liquid chamber while permitting air to flow in and out of the liquid chamber to compensate for the variations of volume due to the relative movement of the piston and cylinder members.

9. A variable speed drive assembly as defined in claim 8, wherein said communications are openings in the walls of said piston member.

10. A variable speed drive assembly as defined in claim 9, wherein the size of said openings may be varied so as to vary the rate of movement of said cylinder member with respect to said piston member.

References Cited
UNITED STATES PATENTS

| | | | |
|---|---|---|---|
| 2,802,367 | 8/1957 | Hoover et al. | 74—230.17 |
| 2,909,071 | 10/1957 | Smyth et al. | 74—230.17 |
| 3,052,132 | 9/1962 | Dittrich et al. | 74—230.17 |
| 3,195,368 | 7/1965 | Boudewijn | 74—230.17 XR |

FRED C. MATTERN, Jr., Primary Examiner

JAMES A. WONG, Assistant Examiner